United States Patent [19]

Olodort

[11] 4,200,363
[45] Apr. 29, 1980

[54] FILM PROJECTOR WITH SOUND PLAYBACK OR RECORDING

[76] Inventor: Robert A. Olodort, 536 N. Highland Ave., Los Angeles, Calif. 90036

[21] Appl. No.: 968,467

[22] Filed: Dec. 11, 1978

Related U.S. Application Data

[60] Division of Ser. No. 873,146, Jan. 27, 1978, which is a continuation-in-part of Ser. No. 699,615, Jun. 25, 1976, abandoned.

[51] Int. Cl.² .............................................. G03B 31/02
[52] U.S. Cl. ....................................... 352/27; 352/119
[58] Field of Search ................. 352/119, 27, 105, 106, 352/113, 115, 116, 117, 129; 350/6.2, 6.3, 6.4

[56] References Cited
U.S. PATENT DOCUMENTS

| | | | |
|---|---|---|---|
| 1,834,197 | 12/1931 | Zworykin | 352/27 |
| 2,250,724 | 7/1941 | Rabinowitz | 352/27 |
| 3,539,251 | 11/1970 | Husted et al. | 352/119 |
| 3,964,826 | 6/1976 | Joseph et al. | 352/27 |
| 4,029,405 | 6/1977 | Stutz | 352/27 |
| 4,087,634 | 5/1978 | Fraser | 352/27 |

Primary Examiner—Monroe H. Hayes
Attorney, Agent, or Firm—Symth, Pavitt, Siegemund, Jones & Martella

[57] ABSTRACT

A motion picture film projector includes a sound head for playing back or for recording a sound track on the film. Absolute synchronism between the picture and sound is assured by the use of a single motor and common shaft to move the film past the sound head and to rotate the optical rectification system. In one embodiment, the sound head is mounted on the concave side of a stationary arcuate film guide opposite the sound track, and the film is driven past the sound head by a sprocket wheel mounted on the common shaft adjacent the optical rectification system.

19 Claims, 25 Drawing Figures

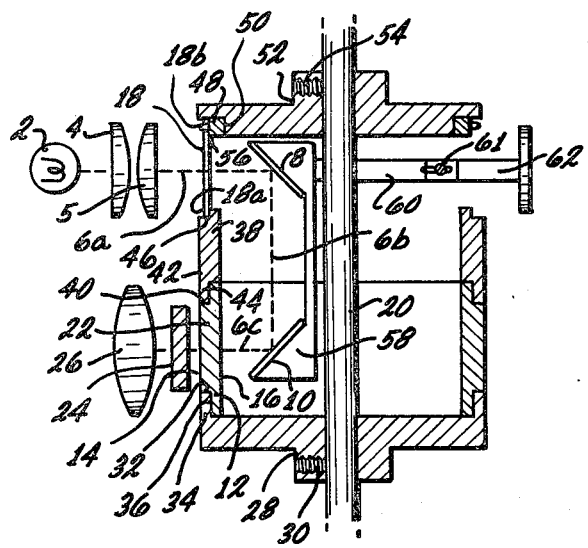

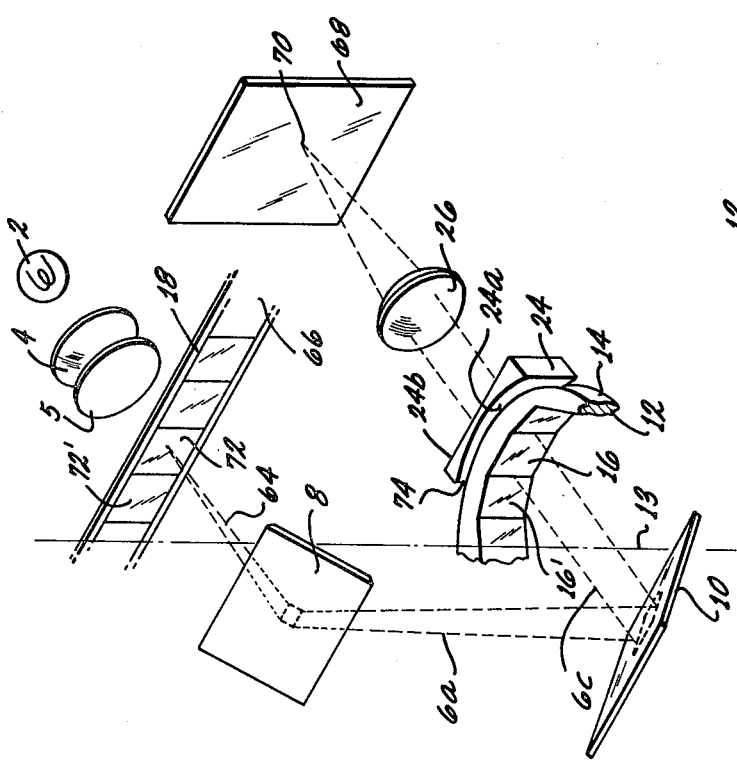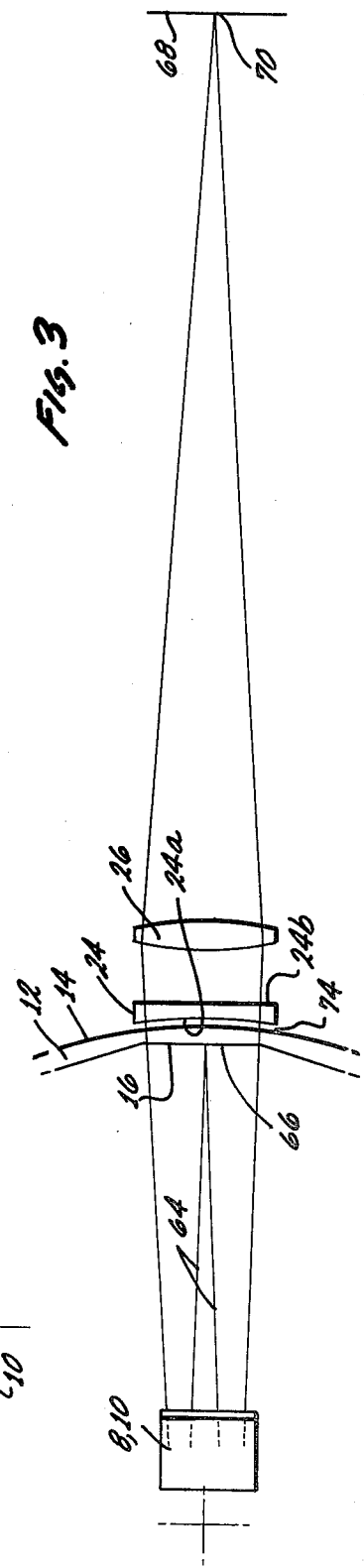

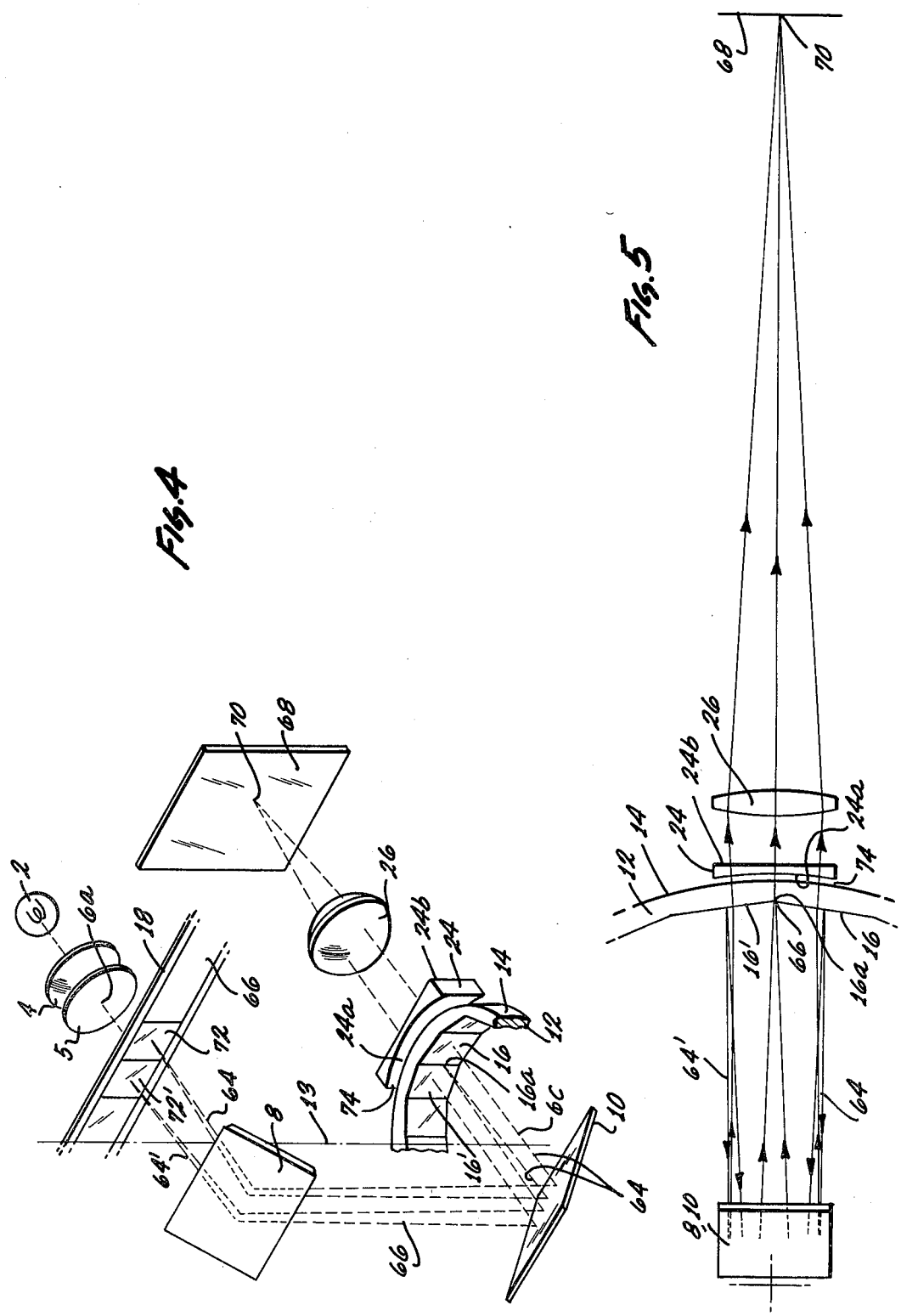

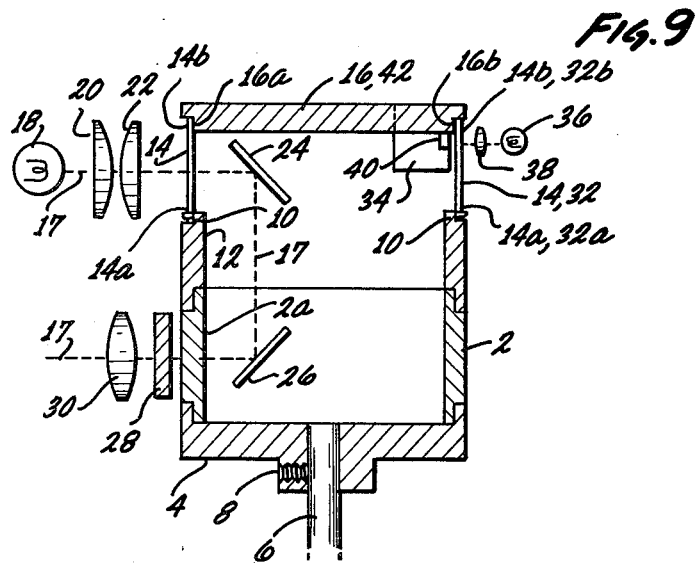
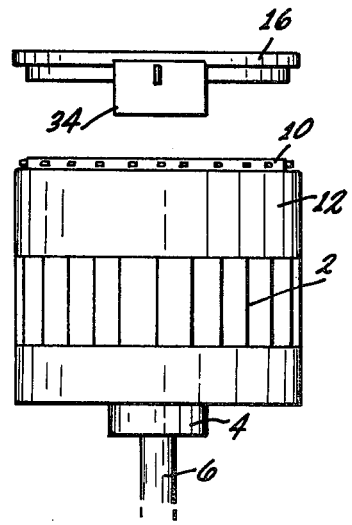
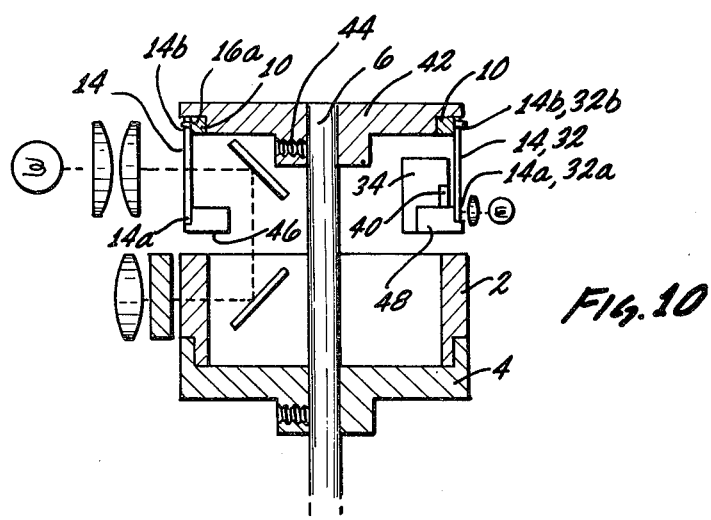

FILM PROJECTOR WITH SOUND PLAYBACK OR RECORDING

This is a division of application Ser. No. 873,146, filed Jan. 27, 1978, which is a continuation-in-part of application Ser. No. 699,615 filed June 25, 1976, now abandonded.

The present invention has been the subject of Disclosure Document No. 056713 filed with the U.S. Patent and Trademark Office on Jan. 7, 1977.

BACKGROUND OF THE INVENTION

1. Field of the Invention

The present invention is in the field of optical devices and specifically relates to apparatus for projecting, viewing and editing motion picture film.

2. The Prior Art

The shortcomings of conventional intermittent movement projection devices are well known. Complex mechanisms are needed to synchronize the intermittent movement pull-down claw, shutter and sprocket wheels. This results in a complicated, expensive and noisy machine. Loops and additional sprocket wheels are needed to isolate the sound reading devices from the intermittent movement to produce adequate sound quality. Slow speed operation produces flicker due to the shutter. Special and complex shutters and movements are needed to compensate for frame rate discrepancies when film-to-video projection is desired. Film that is worn or badly spliced can be easily damaged by the intermittent movement. High speed and reverse operation is hazardous. The machines are heavy to carry and mechanical breakdowns are not infrequent.

To remedy these shortcomings, continuous movement devices have long been sought after. The most successful of these are optical rectification systems using rotating prisms to refract light to compensate for the moving film and thereby to produce stable projected images. However, these devices are not without their own complications. Very few of them are in present use.

Solid or plane-parallel plate prisms are described in the following U.S. Pat. Nos:
- 2,441,013, to Ehrenhaft, issued May 4, 1948;
- 2,508,789, to Harrison, issued May 23, 1950;
- 3,155,979, to Mast, issued Nov. 3, 1964;
- 3,259,448, to Whitley et al., issued July 5, 1966;
- 2,325,131, to Harrison, issued July 27, 1943;
- 3,563,643, to Jeney, issued Feb. 16, 1971. In U.S. Pat. Nos. 2,508,789; 3,155,979 and 3,563,643 gearing is used to synchronize the movement of the film and prism. This gearing is expensive, complicated and noisy and causes backlash which produces unstable images.

Attempts to eliminate gearing are shown in U.S. Pat. Nos. 2,259,448 and 2,441,013. But these systems require complicated light paths, aperture plates, additional optical components, and awkward and bulky mechanisms. Also, the amount of refraction produced by solid prisms is limited by the index of refraction of the material used. Providing high quality multifaceted solid prisms is quite costly and troublesome. Moreover, the results from these devices as seen on a projection screen is a wiping effect between successive film frames producing unstable images at low speeds, and varying illumination causing annoying and fatiguing light flicker.

To achieve high quality flickerless images, various schemes using hollow prisms have been described in the following U.S. Pat. Nos.:
- 2,817,995, to Kirkham, issued Dec. 31, 1957;
- 2,972,280 to Kudar, issued Feb. 21, 1961;
- 3,539,251, to Husted et al., issued Nov. 10, 1970. These prisms are of the "isotransport" design—the sprocket carrying the film and the prism are joined and thereby rotate in unison, eliminating the need for gears or other linkages. These systems succeed in providing a true "lapdissolve" transition between successive film frames. Picture images are therefore stable at low speeds of projection and flicker is eliminated.

In U.S. Pat. Nos. 2,817,995 and 2,972,280 the light rays travel through the walls of the prism twice. Because one wall is close to the film plane, any dirt or scratches on its would have a noticeably adverse effect on the image quality. Moreover, these prisms also have complicated means to adjust the length of the light path to compensate for film shrinkage and manufacturing irregularities. These devices are composed of a plurality of refractive elements, increasing the likelihood of optical aberrations, necessitating the precise alignment of each element and causing the system to be expensive. Furthermore, these designs do not permit a central axle or shaft to be passed through the prism as desired.

In U.S. Pat. No. 3,539,251 the light travels through only one wall of the prism. However, since the facets of this prism are on its outer circumference, the light rays must travel in a step-shaped path for proper optical rectification. (If they were to travel in a U-shaped path, the image of the moving film would be doubly unstabilized.) Because of this no central shaft may be passed through this system either. Consequently, sprocket teeth must be mounted to the prism side of the film and cannot be mounted on the other edge of the film or both edges as may be desired. Importantly, no means are disclosed for adjusting the length of the light path from film plane to prism to compensate for film shrinkage and to avoid the necessity for the precise manufacture and assembly of the prism system.

French Pat. No. 768,714 issued Aug. 11, 1934 to Askania-Werke A.G. discloses an optical rectification device comprising a number of preferably spherical lenses disposed in a ring. Because the lenses are formed at their edges, a shutter is required. This in turn produces flicker. The film is disposed in a plane, and no means are disclosed for relating the movement of the film to the movement of the other parts.

Two basic kinds of motion picture sound projectors are discussed in this application. The first includes those machines designed to project picture film with a sound track encoded on it. The sound track is usually optically printed on the edge of the film or magnetically encoded on a magnetic stripe on the edge of the film. In either case, the sound accompanies the film with the synchronization point of the sound usually displaced ahead of the picture synchronization point. This displacement was originally designed to accommodate the film to prior art cameras and sound projectors and varies according to the width of the film and whether the sound is optically or magnetically encloded. For example, in 16 mm film with an optical sound track, the sound precedes the appropriate picture by 26 frames. This sound-on-picture-film is called "composite" film, and the projectors designed to show this film are called "composite" projectors.

Composite projectors include consumer, audiovisual and professional machines designed for front-screen projection and rear-screen projection. They may be reel-to-reel loaded, manually threaded, "self-threaded", cartridge loaded, etc.

U.S. Pat. Nos. 1,979,718 to Wehr, issued Nov. 6, 1934 and 2,095,848 to Wittel, issued Oct. 12, 1937 describe prior art composite projectors. Since an intermittent film movement creates objectionable sound "flutter", some means are necessary in these machines to cause the film to be continuously moving as it passes over the sound reader. The mechanisms necessary to accomplish this involve complicated arrangements of intermittent film pull-down mechanisms which are linked to one or more continuous rotating sprocket wheels, usually be multiple gears and/or timing belts. Machines employing such mechanisms tend to be relatively complicated, expensive, noisy and heavy. Due to their larger number of moving parts, they are easily subject to mechanical breakdown and require skilled technicians for repairs. Their projected pictures flicker at low speeds because of the shutters necessary for the intermittent movement, while projection at high speeds is hazardous to film due to the fast-moving intermittent pull-down mechanisms. Threading film on these machines, often done by non-technical people such as consumers, teachers, business persons, etc., is complex and time-consuming.

The second kind of projectors are "interlock" projectors, normally used in professional and audio-visual applications. These machines are built to project a picture film and simultaneously and in synchronization to play around from one or more separate magnetic sound films.

An example of a machine which plays one separate sound film is the "Sonorex 16/16 Interlock Projector" distributed by Arriflex Company of America, Cat. No. 253-100. This machine is basically a conventional intermittent projector on one side and a mechanically interlocked sound film player on the other side. Only one sound track can be played at a time.

To play more than one sound film, prior art systems are limited to individual sound reproducing machines synchronized to each other and to a separate projector usually by electronic motor control means. While these "dubbing" systems are useful for professional sound mixing, they are indeed expensive to rent or purchase and inconvenient to use when it is desired only to view a film with separate sound tracks.

In the past, most editing has been done on "upright Moviola-type" editing machines, such as are described in U.S. Pat. Nos. 1,873,341 to Serrurier, issued Aug. 23, 1932 and 1,921,469 to Kuhn et al., issued Aug. 8, 1933. These machines have an intermittent film advance movement which is noisy, mechanically troublesome and which can cause damage to the film. Additionally, this type of movement makes it difficult to achieve good sound quality. These machines were originally designed to accommodate short lengths of picture film and are not adequate by today's standards to handle multiple tracks of long rolls of synchronized picture and sound film.

Some contemporary "flatbed" editors such as described in U.S. Pat. Nos. 3,856,389 to Gardner, issued Dec. 24, 1974 and 3,912,383 to Stutz, issued Oct. 14, 1975 have continuous (non-intermittent) film advance movements and allow for the handling of long rolls of multiple tracks of picture and sound film. However, these machines are relatively expensive, are mechanically very complex, and due to their large size and weight cannot be carried by a single individual nor transported in a standard size automobile.

A third category of editing machines comprises various types of motorized synchronizers with attached viewers, such as are described in the following U.S. Pat. Nos.:

3,427,099, to Marsden, issued Feb. 11, 1969;
3,602,606, to Rigby, issued Aug. 31, 1971;
3,771,860, to Stone et al., issued Nov. 13, 1973, and British Pat. No. 1,016,927, to Hopwood et al., published Jan. 12, 1966. While these machines may be much lower in price and more portable than flatbed machines, they are very slow in operation, do not provide means for automated film feed and take-up, do not have individually and independently clutchable sprocket wheels, and produce low quality sound, and low quality pictures.

Minimizing the size and cost of professional editing machines has become an objective or more and more importance in recent years. There has been a great increase in films made independently in small offices or in people's homes as well as those made on location or elsewhere outside the studio. The large size and weight of flatbed machines have made it impossible, as a practical matter, for one individual to transport such a machine to an office, home, or temporary location. In more permanent editing facilities, such as in studios, rental editing room centers, and film schools, the numerous machines present in one location furthers the need for space-saving machines.

Among the features of the prior art flatbed machines which have contributed to their present limitations from the standpoint of their lack of portability, their complexity and their inconvenience to persons operating them, is their disposition of the film sprocket wheels and feed and take-up plates in the same plane. Thus, as may be seen in U.S. Pat. Nos. 3,856,389 and 3,912,383, considerable surface on the top of the machine is taken up by the film feed and take-up plates which are mounted adjacent one another in the same plane on the table. Any flatbed machine with, for example, one picture and two sound tracks would necessarily require a considerable surface area on its top. Moreover, such a disposition of the film feed and take-up plates makes it difficult for the operator to reach all of the plates to place or remove rolls of film. In addition, such a disposition of sprocket wheels, each with its own axis of rotation, has required separate driving means and electronic interlock devices, or interconnecting timing belts or gears and electro-magnetic clutches and brakes, to selectively drive the sprocket wheels individually or in synchronization. Such mechanisms are expensive and result in the increase of weight, complexity and likelihood of breakdown of these machines. These devices must normally be maintained and repaired only by trained service persons. There is a great need, especially in non-studio locations for a machine which is simple, reliable and largely serviceable by the editor himself.

The disposition of the film sprocket wheels in the same horizontal plane on the flatbed machines also cocupies table space, which limits the working counter space available for the editor's spicing machine, additional rolls of film, film leader, note pads, etc.

SUMMARY OF THE INVENTION

One objective of the present invention is to provide a continuous movement rectification device to permit formation of a steady image from a moving film. Such a rectification system can be applied for use in a wide variety of optical apparatus including, without limitation, silent film projectors, projectors with integral sound readers, editing machines, motion picture cameras, film-to-video transfer machines and the like.

Basic to all of these devices is a particular type of prism used for rectifying the image. In a preferred embodiment, the prism is a hollow right circular cylinder of plastic or other suitable material, and having an interior surface conforming to the shape of a regular prism. The prism is rotated about its axis, and moves in synchronism with the film.

The present invention is based on the discovery that this basic rectification prism has exceptional advantages mechanically and optically which facilitate innovative and highly advantageous designs for projectors with or without integral sound readers, editing machines, motion picture camers, film-to-video transfer machines, etc.

Another object of this invention is to provide composite and interlock sound projectors so constructed as to be relatively inexpensive, easy to thread and operate, quiet, lightweight, capable of low and high speed operation with high quality pictures and gentle film handling, and low in maintenance requirements.

This is facilitated by the use of a single continuous movement sprocket wheel which incorporates both an optical rectification system and a sound reproducing system within its interior. The whole sprocket wheel-picturesound system is "isotransport", that is, there are no gears, belts, cams or other mechanical linkages to interface the film movement, picture, and sound reproduction elements. Because the picture and sound films are conveyed by the same sprocket wheel, the necessity of mechanical or electronic synchronization between the separate films is eliminated.

This drastic reduction in mechanical and electronic components is made possible by the mounting of the sound reproduction element, usually a magnetic head to read record magnetic sound or a photo-cell or similar device to read optical sound, within the sprocket wheel of the optical rectification system.

The optical rectification system used may be of the refractive or reflective type. In either case, the system consists of a continuous movement sprocket wheel which both carries the film and is directly linked to the optical rectification components in an isotransport fashion.

In accordance with the present invention, an editing machine can be constructed simply, relatively inexpensively and with a much greater degree of portability as compared with prior art machines, while being operationally so reliable and effective as to produce faster and more convenient editing.

These advantages are facilitated by the machine's basic design employing coaxial sprocket wheel assemblies and terraced horizontal feed and take-up plates. Clutching and braking means are provided to selectively engage any one or a combination of the sprocket wheels to a common motor-driven shaft; to cause any sprocket wheel to be disengaged to the drive shaft and freewheel; or to cause any sprocket wheel to be disengaged from the drive shaft and braked from rotation. Belt, pulley and one-way clutch means are provided to cause appropriate feed and take-up plates to rotate with the motor-driven shaft to properly feed and take-up film on rolls. Friction and gravity clutch means are provided to insure proper tensioning of film rolls.

An optical rectification device, such as a hollow prism system, is mounted coaxially adjacent to the film sprocket wheel, and by a condensing illumination system, projection lenses and mirrors, the projected image of the picture film is viewed on a rear-projection screen.

Magnetic reading heads are placed within the sound sprocket wheels to come in contact with the sound film. The signal is amplified and hear through a speaker or headphones.

A single control potentiometer/switch is used to operate the motor at variable speeds and in reverse direction.

Because the sprocket wheels can be positively engaged to a common motor-drive shaft, there is no need to synchronize the different sprocket wheels with timing belts or gears, whose backlash limits picture and sound quality, or to synchronize with multiple motors and motor controls which are complex, expensive and troublesome. Furthermore, the coaxial driveshaft/sprocket wheel arrangement puts most of the machine's mechanisms on a single housing, providing for simplified construction, maintenance or replacement. Also, the stacked arrangement of the sprocket wheels provides for a good amount of working table space for the editor. Since all sprocket wheels share the same axis, synchronization points are identical on each track which facilitates marking and cutting film. Since only one sprocket wheel is employed for each film track and because the picture rectification systems and sound reading devices are located within the cavities of their respective sprocket wheels, and due to the unencumbered space in front of the sprocket wheels, short lengths of picture and sound film may be hand fed through the sprocket wheels and viewed without using the feed and take-up plates or other threading means. This feature is very important in certain types of editing, as in television commercial editing, where only short lengths of film are used.

The coaxial sprocket wheel arrangement should be distinguished from a shaft coupling arrangement as described in U.S. Pat. No. 3,771,860. In the latter, the picture sprocket wheel can be uncoupled from the sound sprocket wheels. All the sound sprocket wheels remain coupled to each other at all times. This arrangement is not adequate for fast and professional editing, where any one or a combination of picture and/or sound films may need to be driven or held stationary.

No prior art machine is known to have sprocket wheels which can freewheel like those of the present invention. In the freewheel mode, the sprocket wheel is neither engaged to the driven shaft nor bracked. Film is manually pulled through the sprocket wheel or the sprocket wheel assembly itself is turned via a thumbwheel. This feature greatly facilitates the precise cueing, marking and cutting of certain sound films, such as sound effects or lip-synched dialogue for dubbed films. The freewheel mode also eases the synchronization of the different sound and picture films.

The coaxial arrangement provides for a modular, versatile and low-cost approach to the machine's construction. The addition of another sound sprocket wheel assembly, and its corresponding feed and take-up plates, adds few parts and little cost to the machine. No extra belts, gears, motors or motor controls are necessary.

The coaxial cluster also acts as a flywheel, which, with the additional fact that the magnetic head is mounted within the sound sprocket wheel and thereby isolated by the sprocket teeth from the varying tension of the feed and take-up plates, provides for excellent sound speed stability and quality, without the need for additional flywheels.

Because of the reduction or elimination of friction producing belts gears, flywheels and other linkages and tensioning devices, only a small, inexpensive and lightweight motor is necessary to operate the entire machine.

Importantly, because each film passes through only a single sprocket wheel, film is quickly threaded and unthreaded by the editor. Since this operation is usually performed a great number of times each day, valuable editing time is greatly saved and the editor is less fatigued and less inhibited to make improvements on his work. Also, film damage caused by the misalignment or misthreading between two sprocket wheels is kept to a minimum. By placing the magnetic head and optical rectification systems within the single sprocket wheels, the sprocket teeth themselves provide for proper and consistent tensioning of the film to its sound or picture playback device.

The coaxial arrangement also provides for the low cost and mechanically simple incorporation of optical rectification devices such as hollow prism systems. These prisms produce images of the highest quality. Since the prism rotates in conjunction with its sprocket wheel, no gears or belts are necessary. The central drive shaft can pass through the cavity of the hollow prism if the prism is so designed as to accommodate a U-shaped light path. This preserves the coaxial clutching arrangement, allows the use of multiple picture tracks, provides for a film guide which rotates with the picture sprocket wheel for safe handling of "original" or negative film, and provides for suitable bearing support and linkage to the motor.

The terraced, or stepped arrangement of the machine's feed and take-up plates allows for and corresponds to the stacked arrangement of the sprocket wheel assemblies. Each film travels in a straight horizontal path. The plates are terraced to provide proper clearance for the easy placement and removal of film rolls, with minimum vertical spacing between plates. Minimizing the vertical spacing is important to keep the overall dimensions of the machine to an easily-portable size. In the terraced arrangement, each plate is accessible to the editor from a comfortable seated position without excessive stretching. The stacked design also frees a substantial area of usable table top space for the editor's tools, rolls of film, etc., while keeping the physical dimensions of the whole table to a small, easily portable size. The spindles which drive the plates terminate beneath the table in a common plane, allowing for a simple common belting arrangement, and a minimum number of one-way belting clutches.

Another possible space-saving embodiment of the stacked sprocket wheel/stacked plate concept would employ feed and take-up plates which respectively share a common axis (see FIG. 19). These plates swing out by means of pivoting arms for easy placement and removal of film rolls. Each plate is driven by belt-pulley-friction-gravity clutch means, the driving pulley containing a one-way clutch and mounted to the sleeve of its respective sprocket wheel assembly.

It will be appreciated that a machine of this basic mechanical design—coaxial sprocket wheels and stacked feed and take-up plates—could be built in a different physical orientation (see original patent application). The motor-driven shaft could lie horizontally disposed or parallel to the table top and correspondingly, the feed and take-up plates would be vertically disposed or perpendicular to the table top. Some means, such as a swing-away arm, would be required to retain the film rolls on the plates as opposed to the horizontal plate scheme where gravity secures the rolls to the plates. While the vertical plate system would be similarly low in cost to that described above, it has been found to be less conventient for fast professional editing. More table space is required for the horizontal driveshaft with its coaxial sprocket wheels. For marking or cutting film, the editor must reach over the forward film tracks to get to the ones in the rear. Less convenient is the placement and removal of film rolls, a frequent task in editing. The editor must first swing away the retaining arms on the plates involved.

For transportation, the picture screen housing is removed from the table. The table legs are folded or removed. The machine may then be hand carried in two convenient cases. These cases will fit inside a small automobile.

The extensive simplification of the mechanical aspects of editing machines constructed in accordance with the present invention over the comparable aspects of prior art machines is such that not only are substantially fewer components required so that great cost savings in their manufacture may be made, but the size and weight of the machines may be so substantially reduced as to render them effectively portable. Moreover, machines constructed in accordance with the present invention provide for faster and more efficient editing and will be found to be much easier to service and maintain in good working order than prior art machines.

The novel features which are believed to be characteristics of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a side cross-sectional view of a preferred embodiment of the optical system of a projector in accordance with the present invention;

FIG. 2 is a perspective view, partially diagrammatic, of the optical system of a projector in accordance with the present invention, a film frame and prism facet being centered with respect to the optical axis;

FIG. 3 is a top view, partially diagrammatic, of the optical system of FIG. 2;

FIG. 4 is a perspective view, partially diagrammatic, of the optical system of FIG. 2 with the film frame advanced by half a frame height;

FIG. 5 is a top view, partially diagrammatic, of the optical system of FIG. 4;

FIG. 6a is a diagrammatic top view of a projector having provision for reading the sound track of a film in accordance with the present invention;

FIG. 6b is a diagrammatic side view of a projector having provision for reading the sound track of a film in accordance with the present invention;

FIG. 7 is a diagrammatic top view showing a projector for projecting two films simultaneously in accordance with the present invention;

FIG. 8 is a diagrammatic top view showing a projector for simultaneously reading a sound film and projecting a picture film in accordance with the present invention;

FIG. 9 is a cross-sectional view of a preferred embodiment of the optical system of a sound and picture projector in accordance with the present invention;

FIG. 9a is a side view of the rotating portion of the projector of FIG. 9;

FIG. 10 is a cross sectional view of the optical system of a sound and picture projector with sprocket teeth located differently from those shown in FIG. 9;

DESCRIPTION OF THE PREFERRED EMBDOIMENT

Figure 10A:
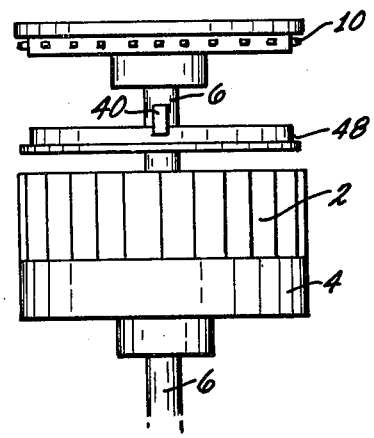
FIG. 10a is a side view of the rotating portion of the projector of FIG. 10.

Turning now to the drawings, in which the same reference numeral may be used to denote different parts in the several drawings, it will be noted that FIGS. 2-5 of the present application are similar to FIGS. 8-11 of the parent application Ser. No. 699,615 filed June 25, 1976.

THE PRISM RECTIFICATION SYSTEM

In contrast to prior art hollow prisms, the hollow cylindrical prism 12 has a cylindrical external surface 13 and a plurality of identical facets 16 disposed about its internal surface as shown in FIGS. 2, 3, 4 and 5. The facets occupy a plane perpendicular to a radius from the axis of the cylinder, are of identical rectangular configuration and are spaced equiangularly about the cylinder axis. Thus, the hollow cylindrical prism 12 has identical cross sections in all planes perpendicular to the central axis 13, the cross section of the external surface being a circle and the cross section of the internal surface being a regular polygon.

As can be seen in FIG. 1, light emitted from stationary lamp 2 passes through stationary condensing lenses 4 and 5 and is directed in a stationary light path 6a through film 18. A stationary mirror 8 mounted at a 45 degree angle with respect to shaft 20 is placed in a light path radially inwardly toward, but spaced from, shaft 20 in such a manner as to deflect the radially inwardly directed light path 6a along a second path 6b parallel to the shaft 20 and extending to a point radially inwardly of at least one prism facet 16.

A second non-rotating mirror 10 at a 45 degree angle with respect to shaft 20 is disposed in this thus-deflected stationary light path 6b to redirect the same radially outwardly into a third stationary path 6c. The path 6c thus passes radially through the wall 22 of the cylindrical prism 12 and, as the prism is rotated, the stationary light path 6c will pass outwardly through each prism facet 16 in succession. Also, disposed in this further deflected light path 6c close to, but spaced from, an arcuate segment of the cylindrical surface 14 of the hollow prism is a stationary cylindrical plano-concave lens 24 and a stationary projection lens 26. Projection lens 26 may alternatively be positioned perpendicular to the light path 6a, 6b or 6c anywhere between film plane 66 and prism facet 16 as desired.

The cylindrical prism 12 is mounted coaxially about, and for rotation with the shaft 20 by means of an annular flanged hub 28 secured to the shaft as by screw 30. Edge 32 of prism 12 is secured to hub 28 by an overlap 34 which seats in an annular recess 36 in prism edge 32. An annular rim 38 may be secured to the edge 40 of the prism 12 by an overlap 42 which seats in an annular recess 44 in the prism edge 40. A somewhat similar recess 46 in the opposite end of the rim 38 may serve to support the edge 18a of the film 18 which edge is opposite the edge 18b supported by annular recess 48 of sprocket wheel 50. Sprocket wheel 50 may be mounted coaxially about, and for rotation with shaft 20 by means of an annular flanged hub 52 secured to the shaft as by screw 54. In this manner, sprocket wheel 50 which engages the perforations 56 of film 18 rotates together with prism 12.

Desirably, the hollow prism with its internal facets may be molded of a plastic material, such as a transparent acrylic. The mold for making the prism 12 should provide the internal surface of the cylindrical prism with the same manner of facets as the number of frames of film 18 that would be accommodated by the total circumference of the sprocket wheel 50. Thus, for example, with 16 mm film having one perforation per frame, the prism should be constructed to have as many facets as the sprocket wheel has teeth for insertion in the 16 mm film perforation. On the other hand, where a 35 mm film is to be used, with such film having four perforations per frame, the prism should be constructed to have as many facets as the teeth on the sprocket wheel, divided by 4.

The mirrors 8 and 10 may be mounted by means of a mirror support rack 58 comprising an arm 60 which may be mounted upon base 62. An adjustment screw 61 may be provided to enable arm 60 to be adjustable with respect to base 62 to cause mirrors 8 and 10 to be raised or lowered for optical adjustments. It will, of course, be appreciated by persons skilled in the art that a right angle prism (not shown) could be substituted for the two mirros 8 and 10.

FIGS. 2–5 illustrate the functioning of the optical rectification system of the present invention. FIGS. 2 and 4 show the relative positions of the main components of the optical system. Lamp 2 and condensing lenses 4 and 5 illuminate film plane 66. Two marginal rays 64 from the film plane 66 strike 45 degree mirrors 8 and 10, pass through the wall of the prism 12, including a facet 16, a cylindrical lens 24, projection lens 26 and become imaged at the center of image plane or screen 68 at point 70. FIGS. 2–5 illustrate the "wedge effect" of the prism in rotation. In FIGS. 2 and 3, film frame 72 and prism facet 16 are centered with respect to projection lens 26. Prism facet 16 is parallel to the flat side 24b of cylindrical lens 24. Marginal rays 64 from the center of film frame 72 strike mirrors 8 and 10 and pass substantially undeviated through the prism 12 and cylindrical lens 24. The air gap 74 between the prism 12 and cylindrical lens 24 is kept to a minimum, consistent with mechanical tolerances and the radius of curvature of the concave side 24a of the cylindrical lens 24 is slightly greater than the radius of curvature of the cylindrical outer circumference 14 of the prism 12, the parts being concentric. Thus, facet 16 of the prism 12 and cylindrical lens 24 in this condition can be viewed essentially as a parallel sided plate. The light rays 64 continue through projection lens 26 and become imaged at point 70 at image plane 68.

In FIGS. 4 and 5 there is portrayed the condition where frame 72 of the film 18 has moved one half of its frame height to bring into the light path 6a one half the next frame 72', and the prism 12 has correspondingly rotated. The line of intersection 16a of prism facets 16 and 16' is now centered with respect to projection lens 26. Film frame 72 is centered with respect to prism facet 16 and film frame 72' is centered with respect to prism facet 16'. Prism facets 16 and 16' now form "wedges" with respect to the flat side 24b of cylindrical lens 24.

Marginal rays 64 from the center of film frame 72 strike mirrors 8 and 10 are deviated by the "wedge prism" formed by the association of prism facet 16 and flat side 24b of cylindrical lens 24. These rays 64 pass through projection lens 26 and become imaged at point 70 at image plane 68. Thus, even though the film has moved one half a frame, the image point at the image plane has remained stationary. Similarly, marginal rays 64' from the center of film frame 72' strike mirrors 8 and 10 and are deviated by the "wedge prism" formed by the association of prism facet 16' and flat side 24b of cylindrical lens 24. The rays 64' pass through projection lens 26 and also become imaged at point 70 at image plane 68. Hence, in this condition, the image of film frames 72 and 72' are superimposed upon each other at the image plane. Through such superimposition there is produced what is recognized as a dissolving effect between successive film frames.

The illumination system is designed to illuminate more than two frames of picture area. In FIGS. 2 and 3 the light for the image at image plane or screen 68 is passed through the whole of prism facet 16. In FIGS. 4 and 5 one half of prism facet 16 passes light to the screen, and one half of the adjacent prism facet 16' pases light to the screen. Thus, the illumination of screen 68 is constant at any angle of prism rotation, thereby eliminating any screen "flicker".

FIGS. 4 and 5 also serve to illustrate why if a U-shaped light path is to be so employed, the prism facet must be arranged about the internal circumference of the prism 12. Given the fact that the film sprocket wheel 50 and prism 12 rotate together about a common shaft 20 and thus rotate in the same direction, a prism with facets about its external circumference as taught in prior art patents would form wedges inclined in the opposite direction to that described abobe, and thereby would refract light in the wrong direction upon passage through the prism and cylindrical lens. The image would thus be doubly unstabilized at the screen—partly by movement of the film and partly by deviation caused by the wedges.

The prism with facets on its internal circumference and the corresponding U-shaped light path employed has some definite advantages over prior art prisms with facets about their external circumference and non-U-shaped light paths.

As best seen in FIG. 1, no light passes through the central axis of the prism and sprocket wheel. A central drive shaft can thus extend through the whole system. This is mechanically advantageous, for the prism system can be supported by bearings on either or both ends, providing a more versatile and more stable support.

Thus unrestricted drive shaft can also be used to drive other ganged prism systems, sound film carrying sprocket wheels, pulleys to drive film feed and take-up assemblies, etc. The continuous shaft also allows for the mounting of the sprocket teeth on either or both sides of the film. As shown in FIG. 1, the sprocket wheel 50 is mounted on hub 52. Instead, or in addition, sprocket wheel 50 could be mounted on an annular rim 38. The sprocket wheel would be ring-shaped to allow the unrestricted passage of light into the cavity of the prism.

The 16 mm release print film, only one side of the film is perforated, the other side carrying the sound track. Depending on the application of the prism system, it may become desirable or necessary to mount the sprocket wheel on the prism side of the film or on the opposite side of the film. This ability to select the proper locations of the sprocket wheel provides for film projectors built to accommodate reels of film wound in the standard manner, so the projected image will be neither reverted nor inverted. In 35 mm applications, where both edges of the film are perforated, two parallel sprocket wheels could be used to properly drive each edge of the wider film.

As shown in FIG. 1, even though the sprocket wheel is not mounted directly to the prism, an "isotransport" relationship between the film and prism is preserved. In prior art schemes where no through shaft is possible, gears or timing belts or other linkages would have to be employed to synchronize the prism to a sprocket wheel engaging the edge of the film opposite the prism. This, of course, would negate the isotransport benefit.

In applications where the sprocket wheel must be mounted to the prism side of the film, the opposite side of the film may be supported by a rotating non-sprocketed wheel attached to the unrestricted driveshaft. Since this wheel rotates together with the sprocket wheel instead of being stationary, as in prior art systems, the film is transported in a very gentle manner. This is important in applications involving "original" or negative film where any possible scratching of film is to be avoided.

The U-shaped light path also provides for the simple means to adjust the length of the light path from the film plane to the prism to properly compensate for film frame height changes caused by film shrinkage and to avoid the necessity for the precise manufacture and assembly of the prism system. Simply raising or lowering the 45 degree mirrors (or right angle prism) accomplishes this adjustment. It can readily be understood that in U.S. Pat. No. 3,539,351 raising or lowering the mirrors would have no effect on the length of the light path from film plane to prism and hence would provide no adjustment. Furthermore, in the present invention, no additional complicated, expensive and aberration-inducing lenses, sliding prisms, wedges, etc., are required as on prior art systems.

Additionally, the U-shaped light path allows for applications where a plurality of picture films can be optically rectified with the same prism. As can be seen in FIG. 7, two separate films, 18 and 19, each with its own lamp 2, condensing lenses 4 and 5, 45 degree mirrors 8 and 10, cylindrical lens 24 and projection lens 26, share the same sprocket wheel 50 and the same prism 12. This scheme is useful in editing machines, for example, where it is sometimes desirable to view two separate films in synchronization to each other in a compact and inexpensive manner. Here, mirrors (not shown) could be arranged to provide side-by-side projection of the two films.

The use of a continuous shaft facilitates construction of a system for optically rectifying the picture of a film while reading the sound track of the film using the same sprocket wheel. In order to place the sound reading or recording system in a proper manner to align with the sound encoded edge of the film, annular rim 38 as seen in FIG. 1 cannot be used. In FIGS. 6a and 6b, stationary film guides 76 and 78 support one edge of film 18. Sound reading unit 80, such as a magnetic head or a photocell as required to read magnetic or optical sound, is fixedly placed within film guide 78 to align with the sound encoded edge 18a of the film. In the case of optical sound, exciter lamp 82 and condensing lens 84 could be mounted on the opposite side of the film. Since the shaft 20 can extend through the prism system, sprocket wheel 50 can be rotated as necessary to drive the film in synchronization with the prism and provide for standard reel loading with a non-inverted nor inverted projected image.

FIG. 8 shows the projector adapted for projecting separate sound and picture films, 86 and 18 respectively. In this embodiment, the sound is read by the sound reading unit 80.

Now that the structure and operation of the basic rectification system has been explained, a more detailed description will be given in the following section of several embodiments of a device for simultaneously optically rectifying the picture on a film while reading the sound track of the film.

MOTION PICTURE PROJECTOR WITH INTEGRAL SOUND READER

The optical-rectification system used, as above, is a hollow prism refractive device in which the light beam travels in a U-shaped path. In FIG. 9, prism 2 is mounted on flanged hub 4 which is affixed to driveshaft shaft 6 as by set screw 8. Ring-shaped sprocket wheel 10 is affixed to rim 12 which is affixed to prism 2. In one embodiment of the projector the prism 2 is molded of plastic and the rim 12 and ring-shaped sprocket wheel are formed as integral parts with the prism. Edge 14a of motion picture film 14 is supported and driven by sprocket wheel 10. Edge 14b of the film is supported by recess 16a of fixed arcuate film guide 16. Light beam 17 from lamp 18 is condensed by lenses 20 and 22, passes through film 14, is reflected in a U-shaped path by mirrors 24 and 26, passes through wall 2a of prism 2, cylindrical lens 28 and projection lens 30.

For sound reading, composite film 14 or a separate magnetic film 32, is transported by another arcuate segment of the system. Edge 14a or 32a of film 14 or 32 is supported and driven by sprocket wheel 10. Edge 14b or 32b of the film is supported on a track formed by recess 16b of fixed arcuate film guide 16. For the reading of a composite film with a magnetic stripe or a separate magnetic film, magnetic head 34 is fixedly mounted to film guide 16 or to another convenient fixed member (not shown, see also FIG. 9a). Magnetic head 34 is thus held in close contact with the film 14 or 32. (It will be noted that in some countries the sound track on magnetic film 32 is recorded in the center of the film rather than on one edge. In these cases magnetic head 34 would be positioned to read this center area.) The signal produced by the magnetic head 34 is conventionally amplified and reproduced through a speaker or headphones (not shown).

To read the optical sound track of composite film 14, light from lamp 36 is condensed by lens 38, passes through the optical sound track edge 14b of film 14 and strikes photocell 40 or similar device. The output of photocell 40 is conventionally amplified and reproduced through a speaker or headphones (not shown). It should be noted that both magnetic head 34 and photocell 40 could be mounted arcuately next to each other in the same projector or they could be mounted in such as way as to be readily interchangeable. For example, if the sound reading devices were each mounted to two different film guides 16 and 42, an operator could select the proper film guide/sound reader to attach to the system in a modular manner. Film guide 16 or 42 might also be composed of two arcuate segments mounted separately.

In some applications, such as in projectors designed to conform to standard film perforation location, the sprocket teeth need to be located on the edge of the film farthest from the prism, the film or films need to be driven at their opposite edge. FIGS. 10 and 10a illustrate this arrangement. Sprocket wheel 10 is mounted to flange hub 42 which is fixed to the driveshaft 6 as by set screw 44. Edge 14b of film 14 is supported and driven by sprocket wheel 10. Edge 14a is supported by fixed arcuate film guide 46. Edge 14b or 32b of composite film 14 or magnetic film 32 is supported and driven by sprocket wheel 10. Edge 14a or 32a is supported by a track formed by a recess in the fixed arcuate film guide 48. Magnetic head 34 and/or photocell 40 is mounted to film guide 48 or other fixed member to properly read edge 14a or 32a of film 14 or 32.

Figure 12:
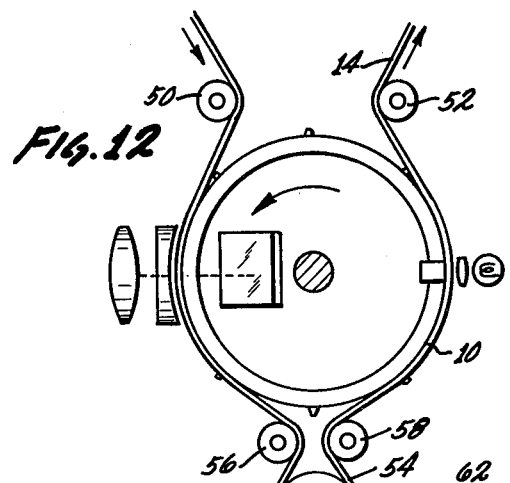
FIG. 12 is a top view, partially diagrammatic, showing a film path including a transport delay for properly synchronizing the sound with the picture.
Figure 11:
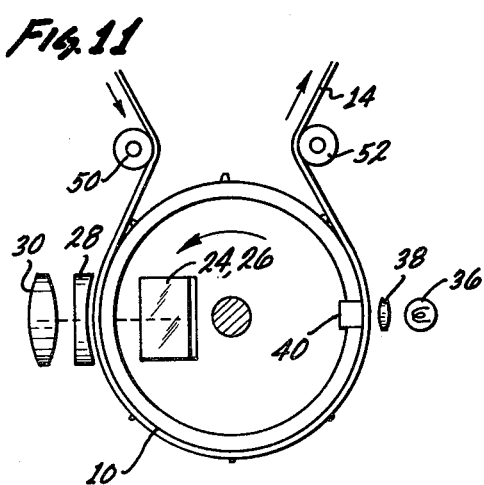
FIG. 11 is a top view, partially diagrammatic, showing the film paths used for playing back both the picture and sound in a preferred embodiment.

For the different types of projectors, appropriate variations of the system are designed to facilitate film threading and to keep to a minimum the number of moving parts. FIGS. 11 and 12 illustrate schemes for reel-to-reel, coaxial reel, channel loading, "self-threading" and other non-cartridge loading projectors.

In FIG. 11 film 14 from a supply reel (not shown) is wrapped around sprocket wheel 10 and then directed to a take-up reel (not shown). The film and sprocket wheel would move in the direction of the arrows. The picture is projected by the optical rectification system on one side of the sprocket (the condensing optics are not shown) while the sound track is read by the sound reader on the other side of the sprocket. Idlers 50 and 52 may be used as necessary. Additionally, as on all the schemes mentioned below, locking means, such as levers with arcuate shoes (not shown) may be provided to prevent the film from coming off the sprocket wheel in instances when no tension is applied.

As mentioned above, in 16 mm optical sound composite film, for example, the sound track normally precedes the picture by 26 frames. In FIG. 11, if it is desired to place the optical rectification system 180 degrees from the sound reader, for example, then a 52-toothed sprocket would provide the proper picture-sound synchronization. If it is desired to use a smaller diameter sprocket wheel, several alternatives are possible to provide proper synchronization. Most simple would be to lessen the distance the sound precedes the picture on the film in the laboratory printing of the film. For example, if a 24-toothed sprocket wheel is used, then a 12 frame gap between picture and sound would place the picture and sound readers 180 degrees apart. Another scheme would be to use a standard 26 frame-gap film with, for example, a 24-toothed sprocket wheel but to delay the sound for an appropriate length of time before it is heard. In this example, if the picture and sound readers are 180 degrees or 12 frames apart, another 14 frames of film needs to be delayed. At the standard sound speed of 24 frames per second, this would be a delay of 14/24 of a second. This audio delay could be produced by electronic means such as charge coupled devices (CCD) or bucket-brigade devices (BBD). Electro-mechanical means, consisting of magnetic discs, drums, endless loops, or other means similar in concept to those described in U.S. Pat. No. 1,965,173 could also be used.

Another method of providing proper synchronization while using, for example, a 26 frame-gap film with a 24-toothed sprocket wheel would be as shown in FIG. 12. Here, a loop 54 of 14 frames of film would be formed to provide the proper 26 frames distance between the picture and sound readers. Proper tension and proper attack angle of the film may be provided as necessary by idler rollers 56 and 58 and by an idler roller 60 which is rotatably attached to arm 62 which pivots about shaft 64 and tensioned with spring 66. The film and sprocket wheel would move in the direction of the arrows.

Figure 13:
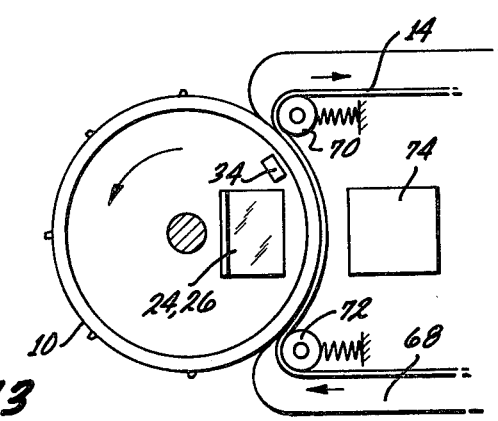
FIG. 13 is a top view, partially diagrammatic, showing a film path for use with film cartridges.

FIG. 13 shows a projector for use with film cartridges. Here, a sound reading head 34 would be fixedly mounted in close arcuate proximity to mirrors 24 and 26 of the optical system. In this manner, a loop of film 14 housed in a cartridge 68 could be held in contact to and driven by sprocket wheel 10, perhaps with the aid of spring-loaded idlers 70 and 72 mounted to the cartridge. A hole 74 in cartridge 68 might be provided to allow clearance for a mirror (not shown) or other components (not shown) of the picture illumination system. The sprocket wheel and film travel in the direction indicated by arrows. In this arrangement, the sound synchronization point might precede the picture synchronization point by, for example, 3 frames. Since this system would have its own unique cartridges and would therefore not be compatible with other conventional cartridge projectors (which usually also are not compatible with one another), the necessary sound-picture gap on the film could be provided for in the laboratory, in this example, 3 frames. However, if desired, an electronic or electro-mechanical audio delay could also be used on this scheme.

Figure 14:
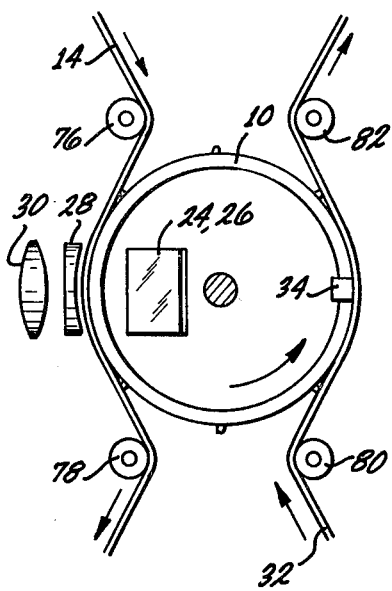
FIG. 14 is a top view, partially diagrammatic, showing a film path for use in interlocking separate sound and picture films for simultaneous projection in accordance with the present invention.

FIG. 14 describes an interlock projector to accommodate one picture film and one separate sound film. Picture film 14 from a supply reel (not shown) is threaded over the optical rectification side of the system, is driven by sprocket wheel 10 in the direction shown by the arrows and winds onto a take-up reel (not shown). Idlers 76 and 78 may be used for proper film tensioning and proper attack angles. Similarly, magnetic sound film 32 from a supply reel (not shown) is threaded over the sound reading side of the system, is driven by sprocket wheel 10 in the direction shown by the arrows and winds onto a take-up reel (not shown). Idlers 80 and 82 may also be used. Of course, either or both films could be run at one time on this machine.

It can readily be seen that a machine could be designed to function both as a composite projector, or if desired, an interlock projector. If the scheme as illustrated in FIG. 12, for example, is used, the threading of film as shown in FIG. 12 would result in a composite projector. However, if an additional supply reel and take-up reel is added to the machine (this could be done in a modular manner) and the films are threaded as indicated in FIG. 14, bypassing idler 60, an interlock projector would result.

Figure 15:
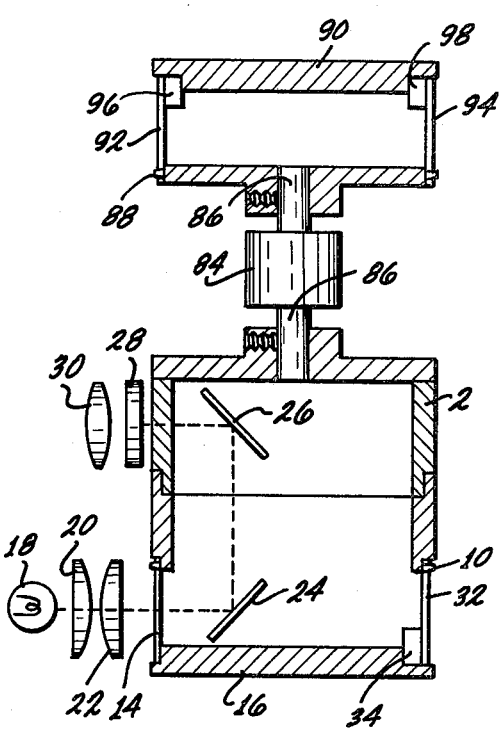
FIG. 15 is a side cross-sectional view of a projector capable of accommodating one picture film and three sound films simultaneously, in accordance with a preferred embodiment of the present invention.
Figure 15A:
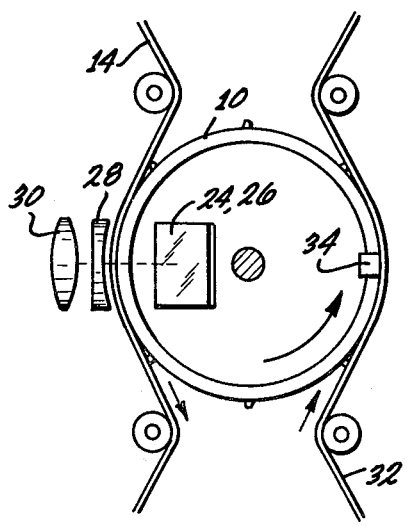
FIG. 15a is a top view, partially diagrammatic, showing the film path for the picture film and one of the sound films used in the embodiment of FIG. 15.
Figure 15B:
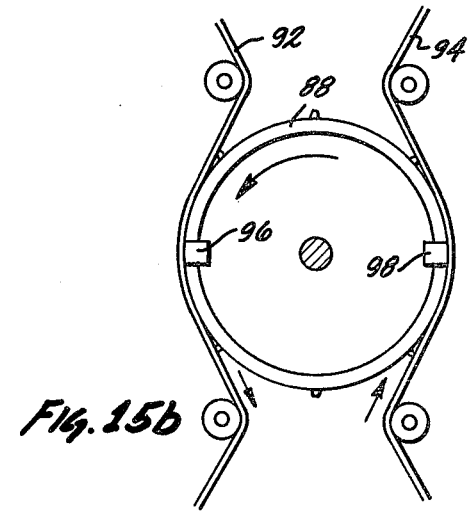
FIG. 15b is a top view, partially diagrammatic, showing the film path for two of the sound films used in the embodiment of FIG. 15.

FIGS. 15, 15a and 15b illustrate a single machine capable of accommodating one picture film and three sound films. In FIG. 15, motor 84 with a double-ended shaft 86 drives prism 2, sprocket wheel 10 and also sprocket wheel 88. If desired, of course, a motor with a single-ended shaft could turn the common sprocket driveshaft by, for example, belts and pulleys (not shown). With the support of the sprocket wheels and fixed arcuate film guides 16 and 90, picture film 14, magnetic film 32, magnetic film 92 and magnetic film 94 are synchronously driven. The four supply reels and the four take-up reels are not shown. Magnetic films 32, 92 and 94 are read by magnetic heads 34, 96 and 98 respectively. FIG. 15a shows the side of the machine designed to drive picture film 14 and magnetic film 32 in the direction indicated. The scheme is identical to that described in FIG. 8. FIG. 15b shows the other side of the machine designed to drive magnetic films 92 and 94 in the direction indicated. Of course, any one or combination of films could be run at one time on this machine.

In professional post-production filmmaking, the sound track being edited usually consists of more than one film. This is to allow the overlapping of sounds from two adjacent scenes and to allow the simultaneous reproduction of the film's narration, music, sound effects, etc. Before these separate sound films are mixed together to a single sound film or to a composite picture-sound film, it is often desirable to project the picture with all its sound tracks, for example, to show the film to clients before a "final cut" is made. Since prior art interlock systems consist of machines such as the Sonorex, which is capable of playing only one sound track, or separate mixing room "dubbers" which are expensive, inconvenient and problematic, a portable low-cost multi-sound track machine as described above is certainly needed.

In all the embodiments described above, the placing of the sound reading head (optical or magnetic) within the sprocket wheel not only facilitates simple threading and simple picture-sound synchronization, it provides for quality sound reproduction without the need for the rotating drums, flywheels, flywheel clutches, capstans, pinch rollers and related devices found in prior art machines. Since the film is held under tension on the circumference of the sprocket wheel and is being pushed at its perforations by the teeth of the sprocket wheel just as the film is read by the sound head, the tension of the film over the sound head and the speed of the film are isolated from the agitations and other disturbances of the supply or take-up reel movements. Furthermore, no backlash-causing gears, belts or other linkages are necessary. In the multiple sound reading projector, no expensive and space consuming individual machines with electronic motor synchronization devices are necessary.

Safe and quiet high-speed operation is made possible by the continuous motion of the sprocket wheel and the lack of flywheels, belts, gears and other similar devices. The single large, continuous movement sprocket wheel on the present invention engages a plurality of film perforations at any one time and therefore is relatively safe in accommodating torn or badly spliced film.

In cartridge-loading and other continuous loop projection machines, where a short length of film must run over and over again for long periods of time, the system's gentle handling of film is very beneficial.

Because of the simple film path required, the construction of channel-loading machines is facilitated. In these designs, the film is simply dropped into a channel and the action of the forward speed control would, via suitable linkages, cause the film idlers to position the film correctly. "Self-threading" machine design is also facilitated. Here, only a small number of film guide channels would direct a length of film to properly wind itself around the sprocket and idlers. In prior art machines, attempts at easing the threading procedure have been problematic, because film jams often occur due to the complexity of the film drive components, and it is difficult to unthread film manually in midroll.

In standard projectors, high speed re-winding of film can be accomplished without the need to unthread and re-thread the sprocket wheel or supply and take-up reels. The projectors described above have no flywheels and hence can be quickly run from forward to reverse. This is useful in dubbing or mixing operations, where the film need to be frequently and quickly reversed to view or record a scene over again.

Professional dubbing projectors must handle taped-spliced work print film and should be capable of safely re-winding film without the unthreading of the projector and the subsequent losing of synchronization with the interlocked sound films. Since dubbing projectors and the associated sound mixing equipment and operating personnel are normally rented by the hour for high fees, any time lost by the projector's mishandling of film is indeed costly.

All the projectors described above the suitable for front or rear-screen projection. Since rear screen machines are normally viewed at close range to the viewer, the quiet operation of the machine is especially significant. In classroom situations, for example, rear-screen projection machines equipped with earphones could be used by some students without bothering those seated next to them.

If it is desired to incorporate the picture-sound-sprocket wheel system in, for example, another motion picture device which has means to drive the film, it can readily be seen that the sprocket wheel could be free-wheeling and therefore driven by the film itself rather than driving the film as was indicated above.

For consumer and audio-visual applications, important features are the low cost of the system, the ease of threading film over the single sprocket wheel, and the machine's light weight. The ability to run film at very low speeds without flicker and at very high speeds without film damage caused by pull down claws provides applications in analysis projectors, library viewers, and film inspection machines. Service and maintenance should be kept to a minimum due to the relative simplicity of design and the very small number of moving parts.

In portable double system projectors which handle separate picture and sound films, the ability to place a sound reader within the same sprocket wheel carrying the picture film provides for a very simple and inexpensive machine. Such a film path, shown in FIG. 14, for example, achieves positive mechanical synchronization of the picture and sound films.

In any of the projectors described above, the sound reading elements could be replaced by sound recording elements; alternatively, sound recording elements could be added to the projectors. When several sound films are employed, as in FIG. 15, a sound mixing machine would result.

The projectors described above are especially well suited for use as film-to-video scanners. Since the system is shutterless, the problem of the differing frame rates of film and video is eliminated. Low cost machines could be constructed so that independent projection companies working in both film and video could own their own machines and transfer film to video at remote locations. Inexpensive machines could also be designed to play home movies on television sets.

In the filmstrip projectors the prism provides smooth lap-dissolves between still pictures for a pleasing and non-fatiguing effect.

Toys of various types, such as front screen, rear screen and eyepiece-viewed projectors could be constructed due to the system's simple design and ability to incorporate inexpensive molded plastic prism rectifiers.

If the projection lens of any of the projectors described above is replaced by a taking lens and if the prism system and film are housed in a light-proof enclosure, the system becomes a motion picture camera. Due to the large, continuous motion single sprocket wheel and isotransport drive, high speed filming would be facilitated.

FILM EDITING MACHINE

Figure 16:
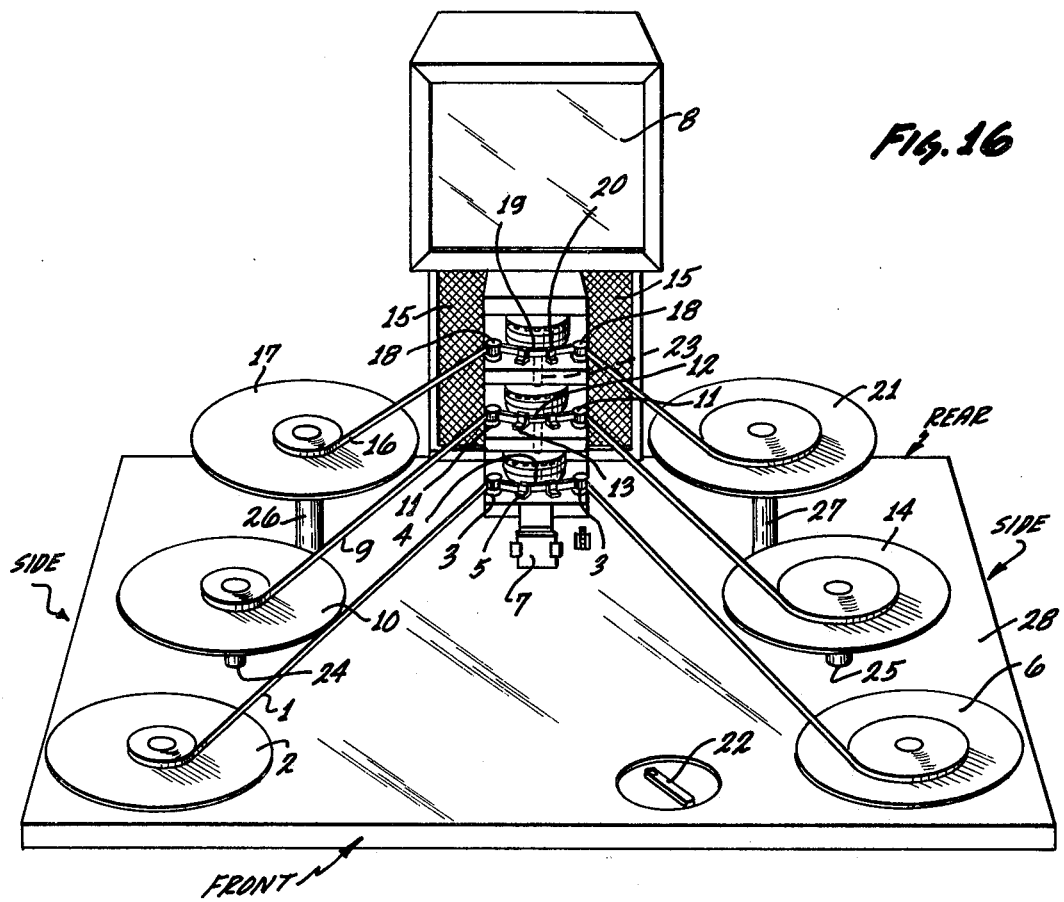
FIG. 16 is a perspective view of a preferred embodiment of a film editing machine in accordance with the present invention.

The optical rectification system described above greatly facilitates the design of film editing machines. FIG. 16 shows a preferred embodiment of a film editing machine in accordance with the present invention. Although the embodiment shown is adapted to enable an operator to edit a single picture film and two sound films, it is understood that editing machines constructed in accordance with the present invention may readily be adapted to handle simultaneously a plurality of picture films and/or a plurality of sound films.

In this embodiment, illustrated in FIG. 16, motion picture film 1 is placed on feed plate 2, placed over rollers 3, retained on sprocket wheel 4 by locking film guides 5 and is coiled by take-up plate 6. Light from condensing system 7 passes through film 1, an optical rectification system (not shown), projections lenses and mirrors (not shown), and is viewed on rear projection screen 8.

Magnetic film 9 is placed on feed plate 10, placed over rollers 11, retained on sprocket wheel 12 by locking film guides 13, and is coiled by take-up plate 14. A magnetic head 77 of FIG. 17 located within the sprocket wheel assembly reads magnetic film 9. The signal is amplified and heard through speakers 15 or headphones (not shown). Similarly, magnetic film 16 is placed on feed plate 17, placed over rollers 18, retained on sprocket wheel 19 by locking film guides 20, and is coiled by takeup plate 21. A magnetic head (not shown) located within the sprocket wheel assembly reads the film as described above.

Potentiometer/switch 22 controls the motor (not shown) which drives the central driveshaft 23, about which sprocket wheels 4, 12 and 19 are coaxially assembled. Spindle columns 24, 25, 26 and 27 elevate and locate their respective plates 10, 14, 17 and 21 in a terraced relationship to plates 2 and 6 and table 28. The terraced relationship is advantageous in placing the plates in a convenient position for loading, unloading and threading, allowing the machine's table 28 to be relatively small in area for portability, yet leaving the central and front portions of the table 28 unobstructed.

Figure 17:
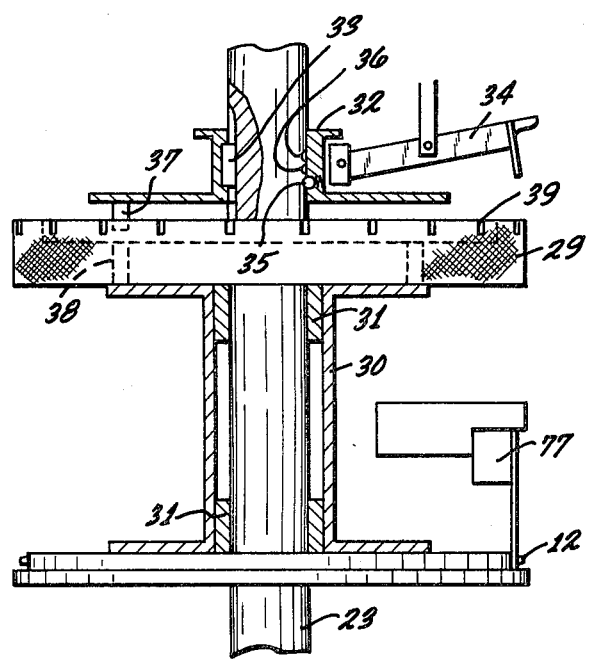
FIG. 17 is a fractional cross-sectional view of the coaxial sprocket wheel assembly used at a film station in the film editing machine of FIG. 16.

FIG. 17 is a drawing of the coaxial sprocket wheel assembly used at each of the sprocket wheels 4, 12, 19 of FIG. 16. Sprocket wheels 12 and thumbwheel 29 are joined by sleeve 30. Bearings 31 allow the sleeve to rotate about driveshaft 23. Clutch 32 is keyed to driveshaft 23 via key 33 and rotates therewith. Shift lever 34 causes clutch 32 to slide upon driveshaft 23. Spring-loaded ball 35 causes clutch 32 to selectively rest in detents 36. When it is desired to engage sprocket wheel 12 for motorized rotation, shift lever 34 is pushed upward, causing pin 37 in clutch 32 to enter and engage one of the holes 38 in thumbwheel 29. The sprocket wheel-sleeve-thumbwheel assembly now rotates with the driveshaft. For freewheeling, shift lever 34 is pushed down slightly, causing pin 37 to retract from hole 38. The sprocket wheel-sleeve-thumbwheel assembly is now free to turn manually. For braking, shift lever 34 is pushed down until it rests in one of the slots 39 in thumbwheel 29. The sprocket wheel-sleeve-thumbwheel assembly is not prevented from rotating.

Figure 18:
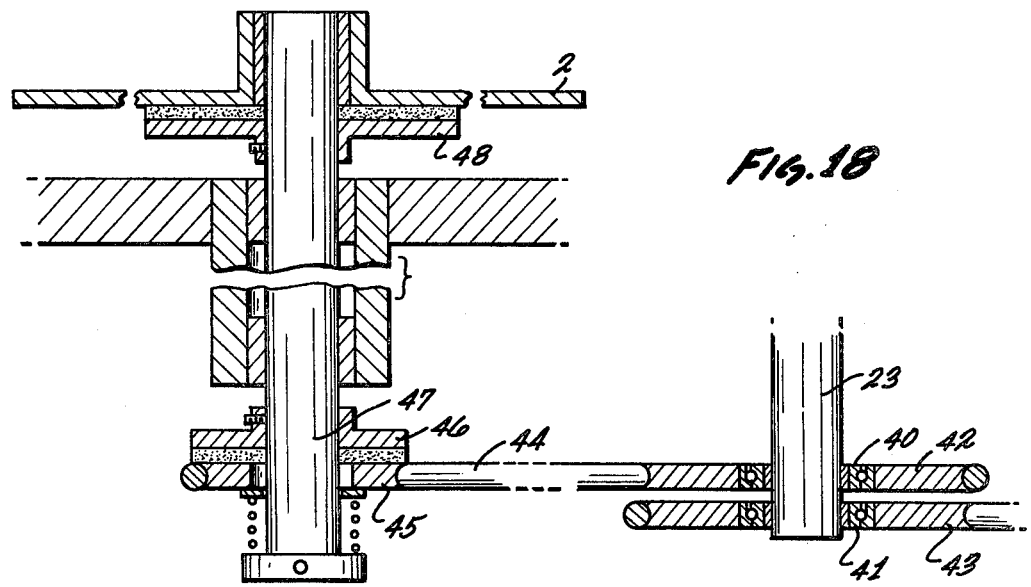
FIG. 18 is a fractional cross-sectional view of the belt drive system for rotating the film feed and take-up plates in the film editing machine of FIG. 16.

FIG. 18 is a drawing of part of the machine's belt drive system which powers the feed and take-up plates. For proper film tensioning, adjustable friction clutches and gravity compensating friction clutches are employed. One-way clutches 40 and 41 cause pulleys 42 and 43 to selectively rotate with central drive shaft 23. Belt 44 drives pulley 45 which is in an adjustable friction contact to disc 46 which is keyed to spindle 47. Plate 2 is in friction contact by gravity with disc 48 which is keyed to spindle 47.

Figure 19:
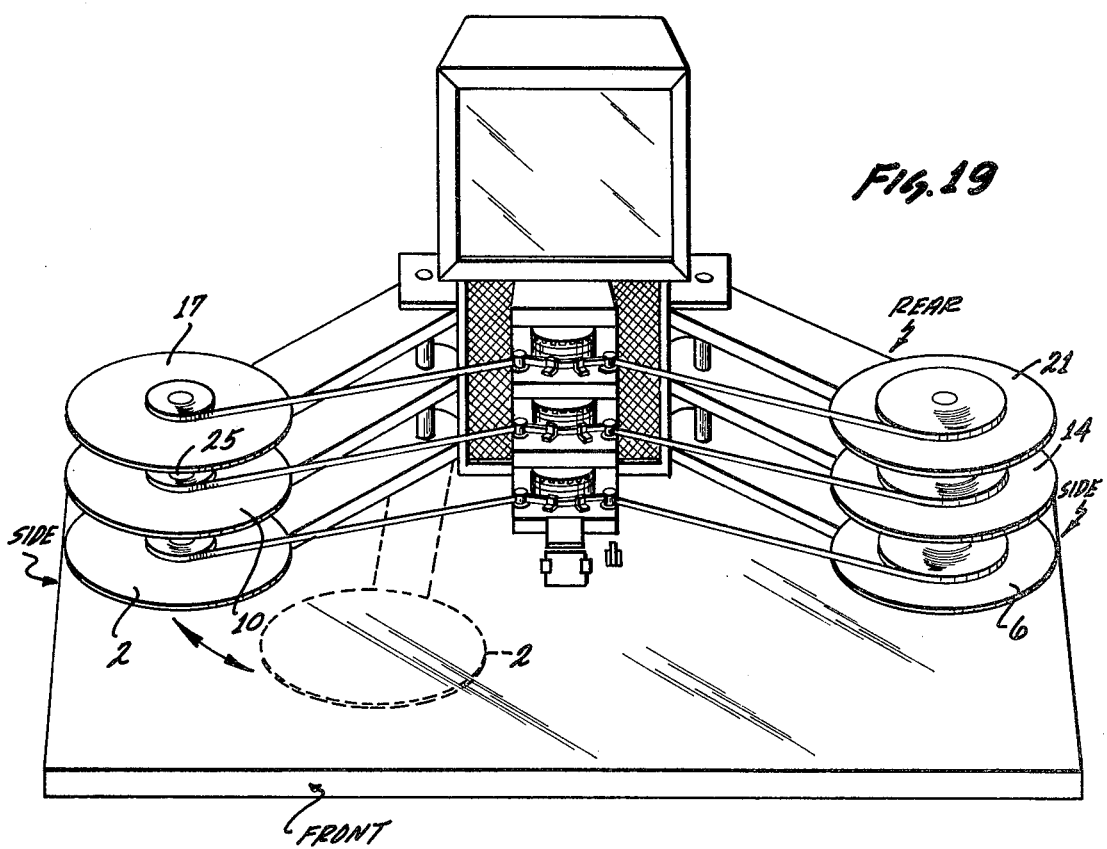
FIG. 19 is a perspective view of an alternative embodiment of a film editing machine according to the present invention.

FIG. 19 shows an alternative embodiment of the film editing machine. In this embodiment, the feed plates 2, 10, 17 are supported in a vertical stack on the left side of the machine, while the take-up plates 6, 14, 21 are supported in a vertical stack on the right side of the machine. All of the feed plates and take-up plates are mounted so as to be individually swingable outwardly and forwardly to facilitate loading, unloading, and threading the film. This arrangement of the plates is found to be convenient in that it allows a large working area on the top of the table while still providing each accessability to the feed and take-up plates.

Figure 20:
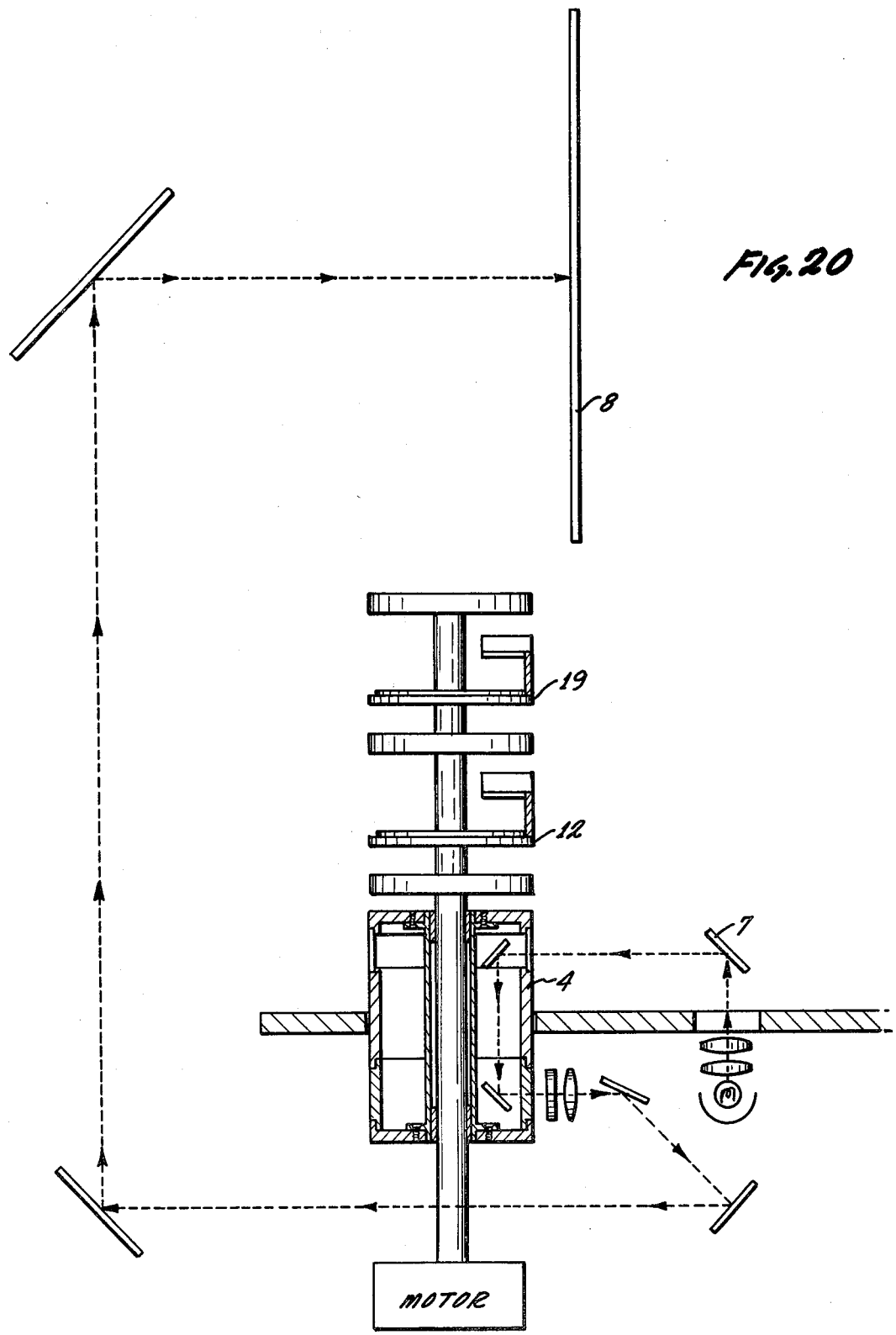
FIG. 20 is a fractional side cross-sectional view, partially diagrammatic, showing the optical path in the preferred embodiment of the editing machine shown in FIG. 16.

FIG. 20 shows the light path and the location of the elements in a preferred embodiment of the present invention, including the rear projection screen 8.

The prism system as used on the editing maching provides for a flicker-free picture, allowing long hours of viewing with little fatigue to the editor. The single sprocket wheel with its isotransport prism system offers quick and easy loading and unloading of film and permits the viewing of short pieces of film. Low and high speed projection is also facilitated. Inexpensive, portable and reliable machines can be built by ganging prism assemblies and sound sprocket wheels together with the system's unique through shaft. Other editing uses include inexpensive and flicker-free viewers, whose sprocket wheels and prisms may be driven by film wound by hand cranked rewinds on editing benches.

Although the editing machine has been shown and described as having a vertical central driveshaft along which the several sprocket wheels are spaced, it is clear that gravity plays no essential part in the present invention and thus the machine can be built and used with the central driveshaft and feed and take-up plate spindles in any desired orientation, the embodiments described being regarded as the best mode.

The foregoing detailed description is illustrative of several embodiments of the invention, and it is to be understood that additional embodiment thereof will be obvious to those skilled in the art. The embodiments described herein together with those additional embodiments are considered to be within the scope of the invention.

What is claimed is:

1. A motion picture projector for use with film having a row of perforations, comprising in combination:
   sprocket wheel means rotatable about a central axis and engaging the perforations of the film to convey the film in a continuous motion along an arcuate path concentric with the central axis;
   optical rectifying means connected to said sprocket wheel means for rotation therewith, and deviating the light through an angle sufficient at each instant to compensate for the angular diviation of the light caused by movement of the film;
   stationary arcuate film guide means including a recess concentric with the central axis for supporting and guiding the film along said arcuate path; and,
   sound reading means a portion of which is connected to said stationary arcuate film guide at a location radially inwardly of said recess.

2. The motion picture projector of claim 1 further comprising sound recording means, a portion of which is connected to said stationary arcuate film guide at a location radially inward of said recess, for recording a sound track on the film.

3. The motion picture projector of claim 1 wherein said sound reading means further cmprise a magnetic play-back head for sensing a magnetic sound track on a film.

4. The motion picture projector of claim 1 wherein said sound reading means further comprise a light sensing device to play back an optical sound track on a film.

5. A motion picture projector for use with film having a row of perforations, comprising in combination:
sprocket wheel means rotatable about a central axis and engaging the perforations of the film to convey the film in a continuous motion along an arcuate path concentric with the central axis;
stationary arcuate film guide means including a recess concentric with the central axis for supporting and guiding the film along said arcuate path;
sound reading means a portion of which is connected to said stationary arcuate film guide at a location radially inward of said recess;
optical rectifying means connected to said sprocket wheel means for rotation therewith, and deviating the light through an angle sufficient at each instant to compensate for the angular deviation of the light caused by movement of the film, said optical rectifying means including:
a hollow cylindrical prism of optically transmissive material, connected to said sprocket wheel means for rotation with it about the central axis, having an external surface of circular cross section concentric with the central axis and having an internal surface whose cross section is a regular polygon with its center on the central axis;
a stationary plano-concave cylindrical lens positioned with its concave surface adjacent to but spaced from the external surface of said hollow cylindrical prism, said concave surface being concentric with the central axis; and,
stationary reflecting means to direct light from the portion of the film in said arcuate path radially outwardly through said hollow cylindrical prism and said stationary plano-concave cylindrical lens.

6. The motion picture projector of claim 5 wherein said sprocket wheel means and said hollow cylindrical prism are parts of a unitary structure.

7. The motion picture projector of claim 5 further comprising:
a hub attached to said hollow cylindrical prism at locations around one edge of it; and
a drive shaft connected to said hub to rotate it about the central axis.

8. The motion picture projector of claim 7 wherein said sprocket wheel means further comprise a hollow cylindrical rim attached to said hollow cylindrical prism at locations around the opposite edge of it, so that said sprocket wheel means rotate with said hollow cylindrical prism, which in turn is driven by said drive shaft.

9. A motion picture projector for use with film having a row of perforations, comprising in combination:
a drive shaft rotatable about a central axis;
a sprocket wheel attached to said drive shaft for rotation with it, and engaging the perforations along a first edge of the film convey the film in a continuous motion along an arcuate path concentric with the central axis, the film extending transversely from said sprocket wheel to a second edge;
a stationary arcuate film guide including a recess concentric with the central axis for supporting and guiding the second edge of the film along said arcuate path;
optical rectifying means positioned adjacent said arcuate film guide, attached to said drive shaft for rotation therewith, and deviating the light through an angle sufficient at each instant to compensate for the angular deviation of the light caused by movement of the film; and,
sound reading means a portion of which is attached to said stationary arcuate film guide at a location radially inward of said recess.

10. The motion picture projector of claim 9 further comprising sound recording means, a portion of which is connected to said stationary arcuate film guide at a location radially inward of said recess, for recording a sound track on the film.

11. The motion picture projector of claim 9 wherein said sound reading means further comprise a magnetic playback head for sensing a magnetic sound track on a film.

12. The motion picture projector of claim 9 wherein said sound reading means further cmprise a light sensing device to play back an optical sound track on a film.

13. A motion picture projector for use with film having a row of perforations along one edge, comprising in combination:
a drive shaft rotatable about a central axis;
a sprocket wheel connected to said drive shaft for rotation with it, and engaging the perforations along a first edge of the film to convey the film in a continuous motion along an arcuate path concentric with the central axis, the film extending transversely from said sprocket wheel to a second edge of the film;
a stationary arcuate film guide including a recess concentric with the central axis for supporting and guiding the second edge of the film along said arcuate path;
a hollow cylindrical prism of optically transmissive material, connected to said drive shaft for rotation with it about the central axis, having an external surface of circular cross section concentric with the central axis and having an internal surface whose cross section is a regular polygon with its center on the central axis,
a stationary plano-concave cylindrical lens positioned with its concave surface adjacent to but spaced from the external surface of said hollow cylindrical prism, said concave surface being concentric with the central axis; and,
stationary reflecting means to direct light from the portion of the film in said arcuate path radially outwardly through said hollow cylindrical prism and said stationary plano-concave cylindrical lens.

14. The motion picture projector of claim 13 further comprising a hub connecting the lower edge of said hollow cylindrical prism with said drive shaft for rotation therewith.

15. The motion picture projector of claim 13 further comprising:
sound reading means, a portion of which is connected to said stationary arcuate film guide at a location radially inward of said recess.

16. The motion picture projector of claim 15 wherein said sound reading means further comprise a magnetic play-back head for sensing a magnetic sound track on a film.

17. The motion picture projector of claim 15 wherein said sound reading means further comprise a light sensing device to play back an optical sound track on a film.

18. The motion picture projector of claim 15 further comprising sound recording means, a portion of which is connected to said stationary arcuate film guide at a location radially inward of said recess for recording a sound track on the film.

19. In a system for rectifying the optical image of plurality of discrete elements spaced from each other and moving in a linear path in a first direction past a first station, (a) A rotatable cylindrical prism, said prism having a hollow core and a plurality of internal facets, each said facet being disposed in a plane perpendicular to a radius of the axis of the prism cylinder, each said radius lying in the common plane with the other said radii and being spaced equidistantly from the next adjacent radii, said prism being disposed with its projected axis perpendicular to a plane comprehending the line of said first direction and spaced axially from said first station;

(b) Optical means, said optical means including first means to reflect the image of each discrete element as it passes by said first station in said first direction, and to reflect the same in a second direction parallel to the axis of said prism, and second means to reflect said thus reflected image further radially outwardly from the prism axis through the prism wall including its facets; and a corrector lens disposed closely adjacent to and outside of the cylindrical surface of said prism and in the reflected path of said image;

(c) And means to synchronize the rotation of said prism with the movement of said discrete elements, such that, as each element moves by such first station, one internal facet of said prism moves past said re-reflected image.

* * * * *